April 12, 1938. K. H. OAKLEY 2,114,060
STAGGERED STEREOSCOPIC MOTION PICTURES FOR FUSION TRAINING
Filed Aug. 14, 1936 4 Sheets-Sheet 1
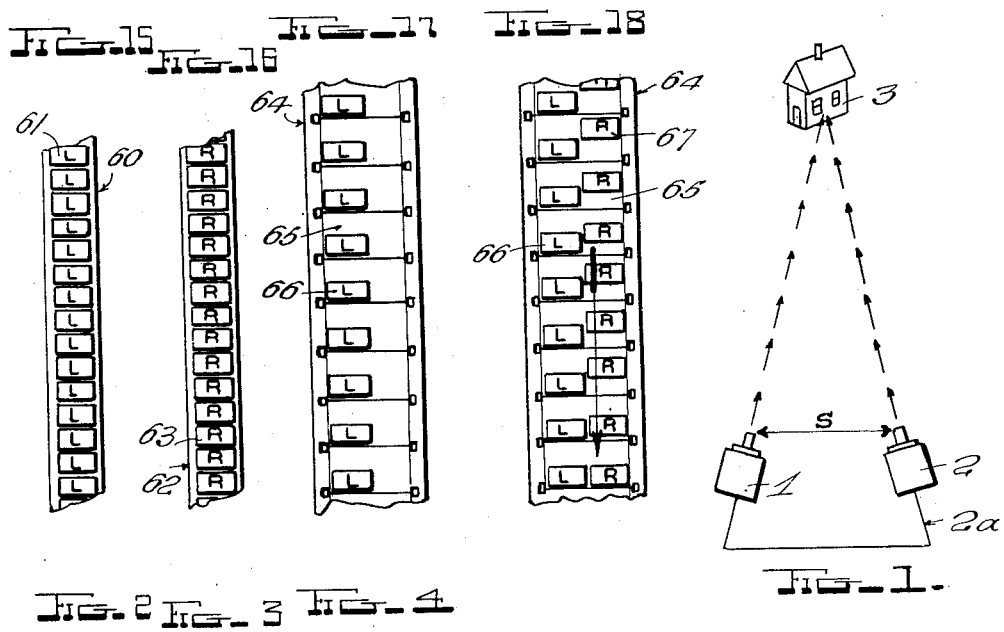
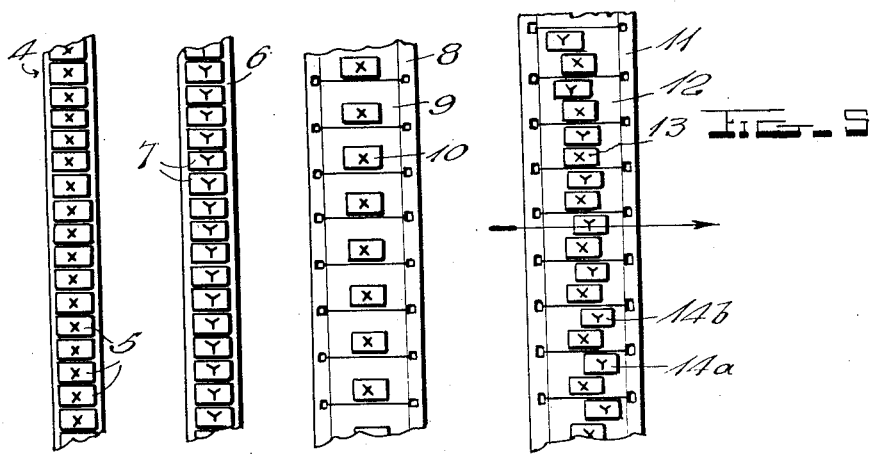
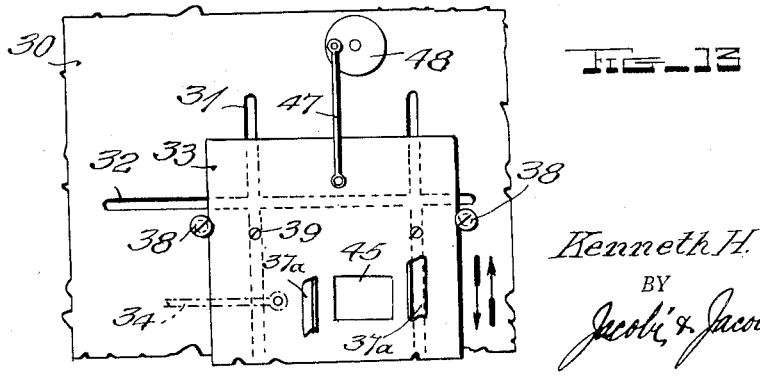
INVENTOR.
Kenneth H. Oakley,
BY
Jacobi & Jacobi ATTORNEYS.

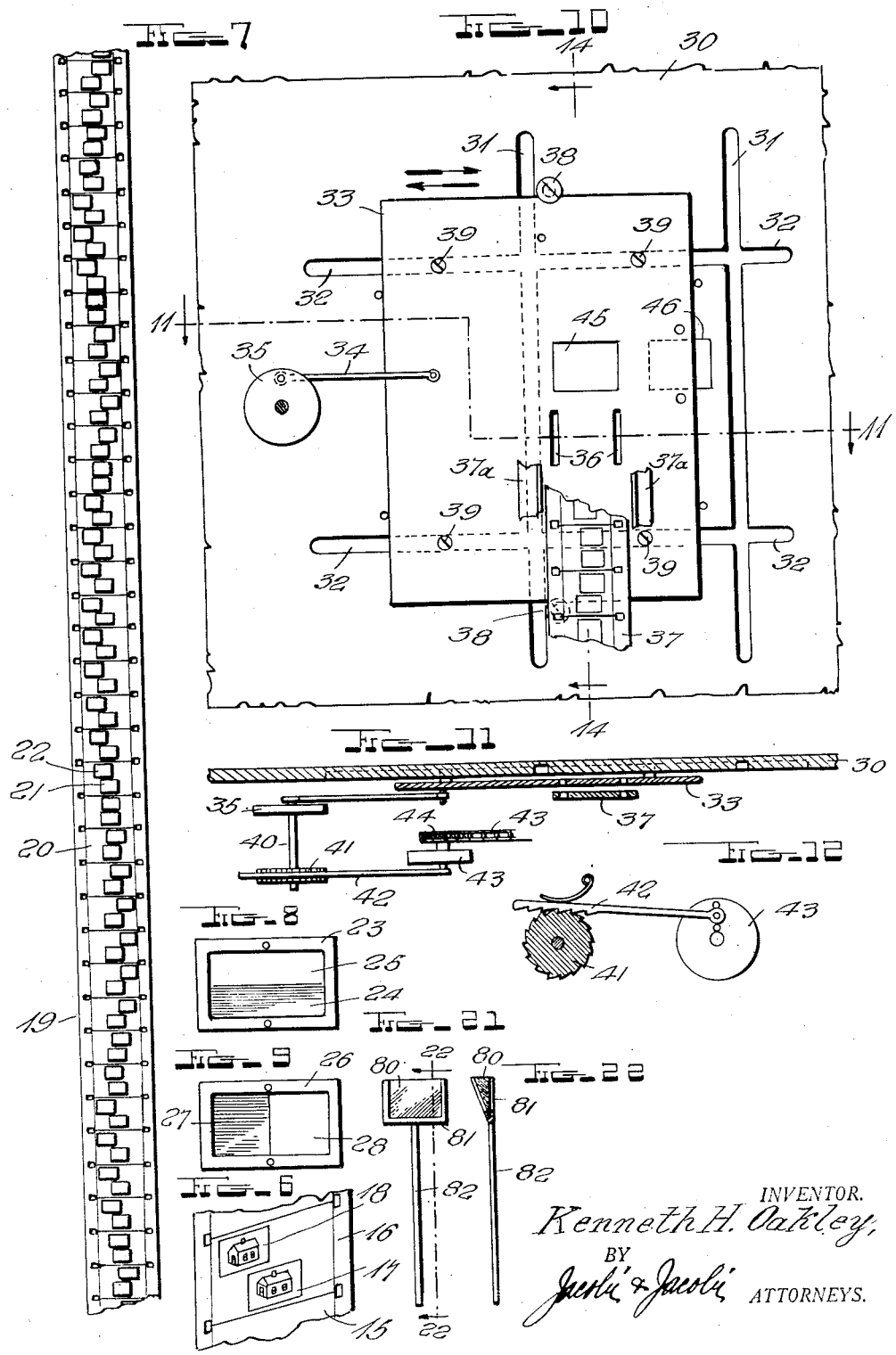

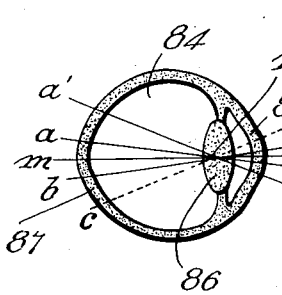
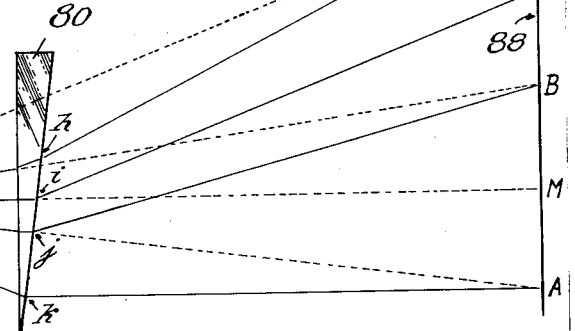
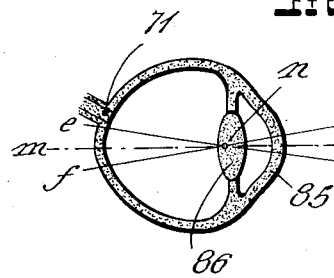
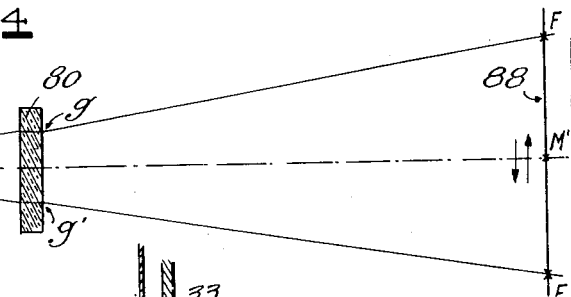
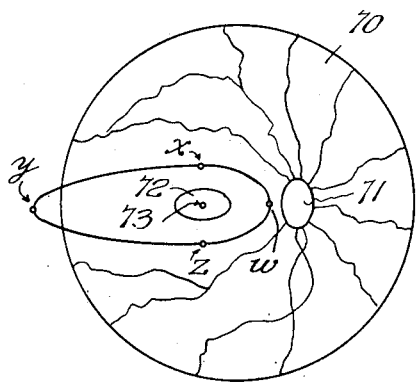
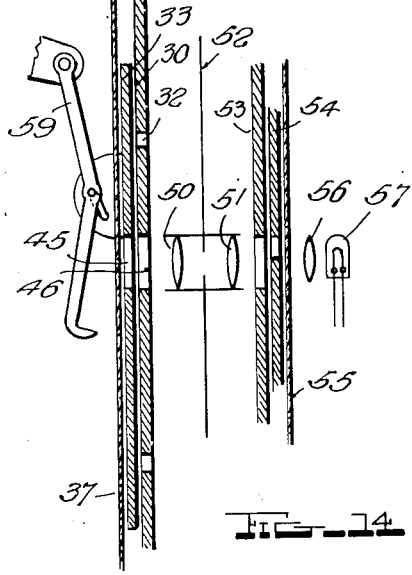
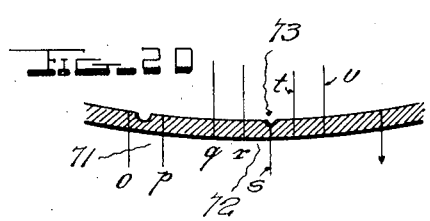

April 12, 1938. K. H. OAKLEY 2,114,060
STAGGERED STEREOSCOPIC MOTION PICTURES FOR FUSION TRAINING
Filed Aug. 14, 1936 4 Sheets-Sheet 4
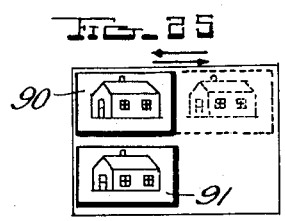
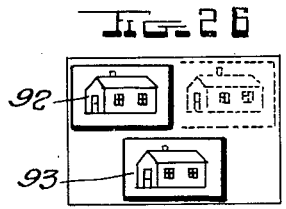
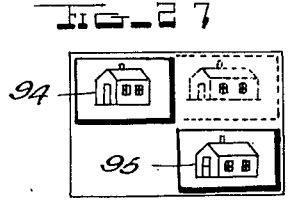
INVENTOR.
Kenneth H. Oakley
BY
Jacobi & Jacobi ATTORNEYS.

Patented Apr. 12, 1938

2,114,060

UNITED STATES PATENT OFFICE 2,114,060

STAGGERED STEREOSCOPIC MOTION PICTURES FOR FUSION TRAINING

Kenneth H. Oakley, Fort Myers, Fla., assignor of one-third to George E. Judd, Fort Myers, Fla., and one-third to John C. Copeland, Chicago, Ill.

Application August 14, 1936, Serial No. 96,101

15 Claims. (Cl. 88—20)

My invention relates to the treatment of strabismus and related conditions by giving the patient fusion training so that he will use both eyes normally, and see a single image with both eyes.

In normal individuals the visual axes of the two eyes are parallel; if there is failure to maintain this parallel relation, there is the condition of squint, or strabismus, or crossed eyes. Two important causes of strabismus or squint are errors of refraction, and an undeveloped fusion sense. It is an object of the invention here disclosed to develop the fusion sense. When squint exists, the two eyes can not form images at corresponding points of the retina, hence the eyes have the choice of seeing double (diplopia), or of suppressing one of the images. Nature chooses the latter course, and usually suppresses the image in the more defective eye. Suppression occurs only when looking with both eyes; if one eye is obstructed, there is no suspension in the other eye.

Early in many cases of strabismus, there is this failure of fusion of the images observed by the two eyes, giving double vision or seeing double if the brain records with both eyes looking. To avoid the continued confusing sensation of double vision, with both eyes looking, the vision center of the brain generally suppresses or suspends the sensation representing the view seen by one eye, or at least by a certain part of the retina of that eye. This is sometimes called nerve blocking. Such vision with one eye necessarily has no depth perception excepting that obtained by a conditioned accommodation, or stereopsis. However, if the seeing eye is closed and the suppressed eye looks alone, the suppressed retina again becomes active and the suspension releases. The nervous system requires much nervous energy for maintaining this suppression. Usually ten degrees of vertical displacement measured from the nodal point in the lens of the eye will throw the image off this blind suspended area and the patient will become conscious of double vision. In these cases the area in one eye in which the retina does not record in the brain center the visual sensation corresponding to the light rays which reach such area of the retina, is in most patients a long oval area having its long dimension horizontal. In about two per cent of all cases, the oval area of suspended vision may have its long dimension vertical. This condition is called suspenopsia. The rods and cones of this area of the retina, and the nerves, are structurally perfect in both eyes, but the sensation from one eye is suppressed by the brain with both eyes open and looking. My invention relates to a method of stimulating the fusion sense and restoring the sensation from the suspended retinal area to alleviate this condition, which is an object of my invention.

Another object of my invention is to provide a composite stereoscopic motion picture film wherein successive frames have a left or right stereoscopic image occupying the same relative position on successive frames, and also a separate right or left stereoscopic image occupying on successive frames positions which are cyclically progressively staggered.

Still another object of my invention is to provide an oscillating transfer printer for printing on to the successive frames, the series of successive stereoscopic images in cyclically progressively staggered positions.

While I primarily describe the use of my composite film with a series of cyclically progressively staggered images, in connection with a prism held in front of one eye, for use in fusion training, it will be understood that my composite staggered film, and the oscillating transfer printer for producing it, are susceptible of various other uses, such as the treatment of phorias, and also reduced ductions, and imbalances, which are comprehended within the spirit of my invention. In order to train the patient to get proper coordination of the visual sensations arising from the two eyes and to get normal binocular vision, it is desired to have the image fall on the retina at points outside of the oval suspension area. The macula lutea or most sensitive region of the retina is usually inside of the oval suspension area, and the sensitivity at a given point of the retina varies substantially inversely with the distance from the macula. It is, therefore, desirable to have the image fall on the retina of the eyes having the suspended area, at a point as near the macula and outside the suspension area as possible for greatest visual acuity, which will be in the direction of the short diameter of the oval suspension area. In the case of most patients, who have the oval suspension area with the long dimension horizontal, it is desirable to have the image fall on the eye with the suspended area at a point vertically displaced up or down from the long horizontal diameter of the oval.

I have found that in order to arouse the fusion sense, it is desirable to employ stereoscopic pictures, and that to maintain the cooperation of the patient it is necessary to show interesting pictures. Motion pictures are particularly suitable for maintaining the interest of the patient because of the continuing action, and stereoscopic motion pictures excite the fusion sense as well as maintaining interest.

However, ordinary parallel pairs of stereoscopic motion pictures will not serve to treat a strabismic patient because the image will fall in one eye inside the oval area of suspended vision, and there will be no visual sensation to be fused.

If the fusion sense can be actively aroused by exciting the retina outside the suspension area, as herein described, so that the image will be perceived by the brain, the extent of the suspension area can be gradually reduced by stimulating the visual sense on the edges of the area.

The need for an object which will attract and hold the interest of the patient in fusion training to get single binocular vision has been present ever since the inception of eye treatment of the type used to correct cross eyes, suspensions of vision, and fusion abnormalities. Methods heretofore employed have used prisms combined with moving targets, or merely prisms combined with stationary targets or pictures, or stationary targets with moving prisms. Several types of treatment have used the usual laterally displaced stereoscopic pictures (stills) either with prisms or with rotation devices, and moving lights thrown on a screen have been used. Vertically displaced prisms have been employed merely to create double vision by displacing the image of one object in a vertical direction. Because of lack of interesting subject matter and for other reasons which have been pointed out, all these methods of fusion training heretofore employed become monotonous, especially to children, who constitute a considerable percentage of these patients. Such monotony is detrimental to progress.

In one form of my invention I provide an ordinary single motion picture projector, which conveniently may be for 16 millimeter film. However, I employ a special type of double-image stereoscopic film, wherein each frame of the projected film has one image occupying the same relative portion of successive frames, while another corresponding stereoscopic image occupies another portion of each frame which on successive frames is cyclically progressively displaced or staggered linearly transversely of the film. Preferably these two images are corresponding stereoscopic right and left images, to properly arouse the fusion sense.

In another form of my invention, one series of images occupies on successive frames positions which are relatively displaced in the direction of the length of the film.

With these and numerous other objects in view, my invention consists in the novel features of construction, combination and arrangement of parts as will be hereinafter referred to and more particularly pointed out in the specification and claims.

In the accompanying drawings forming a part of this application:

Figure 1 shows a stereoscopic camera set for taking corresponding pairs of stereoscopic motion picture frames;

Figure 2 shows the film comprising successive views taken with the left camera of Figure 1;

Figure 3 shows the film comprising successive views taken with the right camera of Figure 1;

Figure 4 shows a film with double size frames on to which the left frames of Figure 2 have been transferred by printing in the same position on successive frames in the lower half of the frame;

Figure 5 shows as a composite the double-frame film of Figure 4 on successively changing parts of the unoccupied portion of whose frames there have been printed the right frames of Figure 3 in progressively transversely staggered positions;

Figure 6 shows in perspective a detail of the composite film of Figure 5 with the moving frame in its extreme left position;

Figure 7 shows a long strip of the composite film of Figure 5, showing in more detail the progressive staggering of the right frames;

Figure 8 shows the horizontally slotted mask used in blocking half of the double size frames in transfer printing of transversely progressively staggered frames;

Figure 9 shows the vertically slotted mask used in transfer printing of longitudinally progressively staggered frames;

Figure 10 shows an elevation of the transfer printer for the transfer of the small frames onto the double size frames in the progressively staggered positions;

Figure 11 is a detailed horizontal sectional view taken on the line 11—11 of Figure 10, showing the reciprocating mechanism for moving the oscillating printing plate;

Figure 12 shows the driving pawl and ratchet of the reciprocating mechanism;

Figure 13 shows a detail of a modification of the transfer printer of Figure 11 for reciprocating the moving printing plate vertically for longitudinally progressively staggered positions on the double size frames;

Figure 14 shows a longitudinal vertical sectional view of the transfer printer taken on the line 14—14 of Figure 10, with the printing apertures aligned;

Figure 15 shows a set of successive frames taken with the left camera of Figure 1;

Figure 16 shows a set of successive frames taken with the right camera on Figure 1;

Figure 17 shows a film with double size frames onto which the left frames of Figure 15 have been transferred by printing in the same position on successive frames in the left half of the frame;

Figure 18 shows as a composite the double-frame film of Figure 17 on successively changing parts of the unoccupied portion of whose frames there have been printed the right frames of Figure 16, in progressively longitudinally staggered positions;

Figure 19 shows a typical fundus oculi or background of a normal human eye, indicating in a general way the area of suspension of vision in strabismus;

Figure 20 is a schematic representation of a portion of the retina including the optic disk and macula lutea;

Figure 21 shows a base-up prism held in front of one eye in viewing the projecting staggered motion picture films for fusion training;

Figure 22 is a sectional view of the prism taken on line 22—22 of Figure 21;

Figure 23 shows schematically as a vertical section the ray paths from the projected horizontally staggered frames of Figure 5 through the prism and the eye to the retina;

Figure 24 shows schematically as a horizontal sectional view the ray paths from the projected frames of Figure 5, through the prism and the eye to the retina;

Figure 25 shows the scene observed over a period of time by the eye in viewing a succession of composite frames of the film of Figure 5 and shows the course traversed by the moving staggered frame, the fixed frame being in the lower left corner of the double-frame;

Figure 26 is a view similar to Figure 25 with the fixed frame centrally placed in the lower half of the double-frame;

Figure 27 is a view similar to Figure 25 with the fixed frame positioned in the lower right corner of the double-frame;

Figure 28 shows what one normal eye sees without a prism in a given position of the head in viewing a projected frame of the composite film of Figure 5 wherein the left and right small frames are vertically aligned;

Figure 29 shows what a normal eye with the same position of the head sees through a prism in viewing the same projected pictures as in Figure 28, the apparent position of the pictures being dropped;

Figure 30 shows the total effect seen by two normal eyes, one without prism, one with prism, in viewing a projected frame of the composite film of Figure 5 wherein the left and right small frames are vertically aligned, showing the stereopsis produced by binocular vision as to the middle image;

Figure 31 shows what one normal eye sees without a prism in a given position of the head in viewing a projected frame of the composite film of Figure 5 wherein the right small frame is staggered horizontally from the left small frame;

Figure 32 shows the total effect seen by two normal eyes, one without prism, one with prism, in viewing the projected composite frame of Figure 31; when the right small frame is staggered so far from the left small frame that the eyes can not fuse and four monocular images are seen without stereopsis;

Figure 33 shows the total effect seen by two normal eyes, one without prism, one with prism, in viewing a projected frame of the composite film of Figure 5, wherein the right small frame is staggered from the left small frame a smaller distance so that the eyes can fuse, and stereopsis is produced by binocular vision through fusion of the middle images;

Figure 34 shows what a suspenopsia patient sees with both eyes without a prism in viewing the projection of an ordinary unstaggered pair of closely positioned projected stereoscopic views, the perception of one of the pair of views being suspended and only monocular vision occurring without stereopsis;

Figure 35 shows what a suspenopsia patient sees with both eyes without a prism in viewing a staggered pair of stereoscopic frames, there being no suspension of either frame and both frames being seen;

Figure 36 shows what a suspenopsia patient sees with both eyes and with a prism over one eye, in viewing a relatively widely staggered pair of stereoscopic frames, with one apparent frame flickering in and out;

Figure 37 shows what a suspenopsia patient sees with both eyes and with a prism over one eye, in viewing a staggered pair of stereoscopic frames which are positioned to overlap less than in Figure 33, with one apparent frame flickering in and out;

Figure 38 shows schematically as a vertical section the assembly of projector, film, screen, and prism, with the eye, corresponding in part to Fig. 23.

The object of holding the base-up prism in front of one eye is to throw the right and left partial stereoscopic images at respective positions on the retina where they will be fused when suspension is relieved. The extra image perceived above one of the images which is fused helps to reduce the height of the suspending area by making the two eyes see corresponding images together at the same time. When the image on the suspended eye is about ten degrees off as measured from the nodal point of the lens, the patient becomes conscious of double vision and his fusion sense is aroused to try to fuse the two images. This results in stimulating the supended area to try to see the scene while employing the non-suspending area of the retina.

A primary purpose of viewing my stereoscopic motion pictures with a left or right picture being continuously translated laterally back and forth, is to develop the ability of the patient to see the same object at the same time with both eyes, which involves the lessening of the synaptic nervous inhibition of the optic nerve or tract of the turning eye. By moving the oscillating picture horizontally across the retina, a larger portion of the suspending area is covered, and the larger the area covered the greater is the stimulus to attain fusion. As an oscillating right picture is brought down to the level of the left picture, the impulse to attain fusion is stimulated, the nervous reactions of fusion are awakened, and as the size of the suspending area is continuously reduced with successive treatments, one of the images will flicker in and out, until finally no more suspension occurs. In my arrangement, the fields of the pictures viewed are large enough to fall outside of the usual suspension areas at some steps of the oscillations. If more or less prism base-up is desired, the patient can be moved backward or forward to vary the relative fixed vertical displacement of the frames, as the individual case requires.

Referring to the figures in detail, Figure 1 shows a camera set for taking left and right stereoscopic partial motion pictures comprising the left camera 1 and the right camera 2 whose operation is synchronized by a synchronizing line 2a. Ordinarily in taking stereoscopic pictures the camera lenses will be separated by a distance S which is determined by the formula for the distance of the object from the camera and from the background to ascertain the best stereoptic effect. The fixation object 3 is shown here as a house, but of course may be any object.

Figure 2 shows the film taken with left camera 1 on a film with small frames; in practice for this purpose I ordinarily employ standard 8 millimeter film. This left film taken with left camera 1 is designated as 4, and has the small size frames 5. Figure 3 shows the small size film 6 with frames 7 taken with right camera 2, having frames which are complementary to frames 5 taken with left camera 1. The small size films 4 and 6 may be negatives.

After films 4 and 6 are completed, they are printed by transfer printing onto the frames of a larger size of film as shown in Figure 4. For this larger film, if films 4 and 6 are standard 8 millimeter film, I employ standard 16 millimeter film. In any case, ordinarily, the frames of the larger size film of Figure 4 will have twice the breadth and twice the longitudinal height of the smaller frames of films 4 and 6 of Figures 2 and 3. With 16 millimeter film perforated on both margins, the usual width of the picture frame proper is about 10 millimeters.

The larger size film 8 of Figure 4 having frames 9 is printed as a composite film by step printing. The left images 5 of left film 4 are first printed onto corresponding portions of the successive frames of Figure 4, as designated by the frames $x$. In Figure 4 I have shown the small frames $x$ as occupying the central portion of the lower halves of the successive frames 9 of the large size film 8, but small frames $x$ also may be printed onto other corresponding portions of the larger frames, such as the left or right corners of the lower half of frames 9, or other corresponding portions of the frames. It will be apparent that in the operation of transfer printing frames $x$ onto large film 8, it will be necessary to run the larger film 8 through the printer at twice the footage per second with which the small film 4 is run through. After the small frames $x$ have been printed onto film 8, the small right frames $y$ are printed onto portions of the large frames 9 which are not occupied by any portion of frames $x$. In printing frames $x$ onto frames 9 a portion such as the upper half of frames 9, which is not occupied by frames $x$, is protected from the incident light by a suitable printing mask. In printing frames $y$ onto the portions of frames 9 not occupied by frames $x$ another suitable mask is used, which in the case of using separate vertical halves of frames 9, may be accomplished by simply reversing the mask.

In any case, I ordinarily intend that either the left or right stereoscopic image shall be printed onto the same corresponding portion of each successive frame 9, and that the other stereoscopic image, right or left, shall be printed onto the portions of successive frames 9 not occupied by the preceding small frame in positions which are cyclically progressively staggered. Thus in the arrangement shown in Figure 4, where fixed frames $x$ occupy the central portions of the lower halves of successive frames 9, the small frames $y$ are shown in Figure 5 at positions 14a and 14b being progressively displaced toward the left from a right position 14a to the extreme left margin, after which frames $y$ will be progressively displaced toward the right until they reach the right margin, after which the cycle will be repeated. I provide a special type of printer for accomplishing this progressive displacement of frames $y$.

For the small film 4 of Figure 2, conveniently 8 millimeter film, I may employ positive film, because 8 millimeter negative film is at present not readily commercially available, and it therefore may be more convenient in practice to use reversal printing.

In the second exposure of film 8 in printing frames $y$ thereon, it will also be necessary to run film 8 through at twice the footage of the smaller frames of film 6. Figure 5 shows the composite film 11 whose frames 12 have the smaller frames 13 and 14a, 14b, occupying separate portions of frames 12. The composite film 12, after the second printing, is developed, and if necessary a positive print is made, which is projected by the usual type of projector; in the case suggested above, by the ordinary 16 millimeter projector. In its progressive movement in successive frames, the travel of small frames $y$ across the frames of a 16 millimeter film will be substantially half the width of the 10 millimeter width of the frames, or about 5 millimeters.

Figure 6 shows in perspective a large frame 16 of the large film 15 of Figure 5, with the oscillating small frame 18 in an extreme left position, and with small frames 17 and 18 both showing the fixation object 3 of Figure 1.

Figure 7 shows a long strip of the composite film as shown in Figure 5, with one small frame occupying the central portion of the lower half of each small frame, and the other small frame occupying cyclically progressively staggered portions of the upper half of each large frame.

Figure 8 shows a type of mask suitable for transfer printing of the left small frames $x$ onto the lower transverse halves of large frames 9, or by reversing the position of the mask 23 of Figure 8, for printing the small frames $y$ onto the upper halves of frames 9. The mask 23 has an opaque portion 24 and a light-transparent portion 25, and in the position shown in Figure 8 is adapted for printing frames $y$ onto the upper halves of large frames 9. However, other forms of mask may be used to print small frames $x$ and $y$ onto other portions of large frames 9. For instance, Figure 9 shows a mask having an opaque portion 27 and a light-transparent portion 28 separated by the vertical short diameter of the mask, which is suitable for printing frames $x$ onto say the left vertical half of frames 9, and then printing small frames $y$ onto progressively staggered positions of the right half of frames 9.

Figure 10 shows an embodiment of an oscillating step printer for printing the small frames $y$ onto cyclically progressively staggered portions of a portion as a half of large frames 9 of film 8. 30 is a stationary plate of the body of the printer, and is provided with vertical slots 31 and horizontal slots 32. For convenience in describing the oscillating printer which I employ, I have described an optical printer, since this is susceptible of a clearer showing, but the type of structure which I here describe is also susceptible of application to a direct contact printer.

33 is a moving plate carried by sliding bolts or similar members 39 which are adapted to snugly slide in slots 32 or 31.

A reciprocating mechanism is provided for imparting to movable plate 33 its progressive oscillating movement for printing small frames $y$ onto cyclically progressively staggered positions of the large film. This mechanism includes the pivoted rod 34 and the drive wheel 35. Movable plate 33 is provided with the usual slots 36 for the pull-down mechanism, and with the usual film guides 37a for guiding the large size film 37 past the printing aperture 45 in movable plate 33.

Figures 11 and 12 show details of driving mechanism for driving the reciprocating mechanism 34, 35. The drive wheel 35 is driven by shaft 40 which in turn carries ratchet 41. The pawl lever 42 engages the teeth of ratchet 41 against which it is held by a suitable spring, and moves ratchet 41 forward only during its forward movement. Pawl 42 is reciprocatingly actuated by drive wheel 43 which is carried on a shaft 44 driven by a suitable motor not shown. Cooperative synchronizing means such as a sprocket and chain drive is provided for synchronizing the operation of this reciprocating mechanism and of the pull-down mechanism, so that the plate 33 is at rest at the time of exposures, and the film is pulled down when the plate is moved.

Figure 13 shows a detail of a modification of the printer mechanism of Figure 10, as arranged for the case in which one of the small frames $y$ is printed on the right half of the large frames 9 in progressively staggered positions. For this purpose it is necessary to provide the reciprocating mechanism comprising the pivoted rod 47 and drive wheel 48 for oscillating the movable plate 33 up and down on bolts 39 in vertical slots 31. Drive wheel 48 is driven on a shaft by mechanism similar to that shown in Figure 11. Suitable film guides 37a are also provided in this modification, and means is provided for retaining a frame of film 37 (see Fig. 10) in register with exposure aperture 45 of plate 33. At the instant of exposing the frame of large film 37, the aperture 45 of moving plate 33 is in register with aperture 46 of stationary plate 30, but as successive frames of film 37 are exposed, the portion of aperture 45 in register with a given portion of aperture 46 changes. The mask 23 or 26 is mounted in aperture 46 of stationary plate 30. In Figure 10, for convenience in draftsmanship and for clarity, I have shown aperture 45 entirely out of register with aperture 46, but this condition would not ordinarily obtain in practice, since the apertures would ordinarily overlap at least partly on one side or the other. The size of apertures 45 and 46 would ordinarily correspond to the size of the printing frames of film 37, which for ordinary 16 millimeter film perforated on both edges would be about 10 millimeters wide.

Figure 14 shows partly in section a vertical longitudinal view of my oscillating transfer printer taken on the line 14—14 of Figure 10, it being understood that such section is taken with aperture 45 in register with aperture 46. Back of stationary plate 30 is a lens unit comprising lens elements 50 and 51 between which is an iris diaphragm 52. The 8 millimeter film which is being copied is shown at 55, upon which is projected light from a suitable source 57 through a condensing lens 56. Back of film 55 is the 8 millimeter plate 54 which can be adjusted, in the case of an 8 millimeter film, 4 millimeters in one direction, or 8 millimeters in the other direction, and then set there. 53 is the stationary 16 millimeter plate on the light source side of the iris which forms part of the body of the printer with intermittent mechanism. By making suitable adjustments of the positions of the lens elements and plates of the optical printer, the image of the 8 millimeter frame can be thrown on the desired portion of the aperture 46 of plate 30. Ordinarily the 8 millimeter plate and the optical system are adjusted to form the image on the upper half of the aperture 46, which for 16 millimeter film will be about 10 millimeters wide. As previously stated, a contact printer may be used instead of an optical printer, which has the advantage of avoiding the necessity of adjusting the position of the lens system.

Figures 15 and 16 show respectively left and right corresponding stereoscopic frames taken from cameras 1 and 2 of Figure 1, and have frames 61 on film 60, and frames 63 on film 62, respectively. The left frames L of film 60 are in this modification printed in the same position in the left vertical half of frames 65 of large film 64 shown in Figure 17. In Figure 17 the frames L are shown printed in the extreme lower position in the left half of frame 65, but frames L may be printed in any other suitable position in the left vertical half of frame 65, such as the uppermost position or a median position. In printing this modification of my composite film, the second exposure of large film is made using my oscillating transfer printer in the modification shown in Figure 13 giving the vertical reciprocating movement, which prints small frames R in positions of the right vertical half of frames 65 which on successive frames are cyclically progressively staggered. This type of composite film with vertical displacement of one series of small frames is employed in treating the relatively small number of patients who have a suspending area of the retina whose long axis is vertical.

In order that the principle and operation of my invention as applied to the eye conditions which I have described, may be better understood, I have shown in Figure 19 a fundus or background of the human eye in a typical form, showing a portion of the retina as seen by the optometrist looking with a suitable instrument through the pupil and lens. The optic disc is shown at 71, and the macula lutea or relatively most sensitive portion of the retina is shown at 72, and the point of most sensitive visual acuity is shown at 73. The retina is shown at 70. Surrounding the macula is an area or field of fusion, or field of duction, which is of approximately oval or kite shape, in which an incident image will involuntarily make the ocular muscles pull the macula to the position of the image, constituting a guiding control of the movement of the eye. Whenever such an image is displaced into any part of this field of duction, the guiding control, through the fusion faculty of the mind, will cause the eye muscles to move the macula to the image, so that there may be binocular vision. In Figure 19 the area $wxyz$ shows the general shape of the field of fusion. The displacement of an image into this area may be caused by a prism or otherwise. If too strong a prism is used which throws the image outside the fusion field, the guiding control will not be aroused and the eye muscles will not move the macula to attain fusion. Ordinarily, the nasal limit of the fusion area, as measured by a prism base-in, in front of the eye, is about 8 degrees, the temporal limit as measured by prism base-out, about 25 degrees, and the lower or upper limit each about 3 degrees in a normal eye, but the size of the area may vary considerably in different subjects. The fovea centralis shown at 73 is the most sensitive point of the retina and has a diameter of about 0.5 millimeter, and is on the temporal side of the optic disc. The fovea is the central point of the macula lutea, which has a diameter of about 2 millimeters, and is about 3 millimeters from the optic disc. The optic disc, where the optic nerve enters, has a diameter of about 1.5 millimeters, and the diameter of the eye-ball is about 24 millimeters. These dimensions will give an idea of the dimensional problems of physical optics here involved. In Figures 23 and 24 I show ray paths of light rays incident upon the region of the retina just described, and in these figures I have intentionally exaggerated the size of the areas involved for purposes of clarity.

Figure 20 shows a section of the back of the retina in the immediate vicinity of the optic disc and the macula. The optic disc 71 is shown at $op$, the fovea 73 at $s$, the macula 72 at $rt$, and one end of the field of fusion is shown at $q$. The temporal side is the right side of Figure 20.

As has been previously explained, in cases of suspenopsia, there is a failure of the grain to fuse the two images observed by the two eyes, resulting in seeing double, and the result is that the brain suspends or blocks perception from one eye to avoid the confusing sensation of seeing double. The area of suspension usually has the same general shape as is shown in Figure 19 at wxyz, and may extend over the entire area of the field of fusion or the field of duction there shown. It is a purpose of the type of treatment which I describe to reduce the size of this area of suspension.

In Figure 21 there is shown a base-up prism 80 mounted in a suitable frame 81 on a handle 82, adapted to be held in front of one eye. A convenient form of this prism is with a base about 1½ inches square and with a vertex angle of about 5 degrees. The vertex angle depends on how near to the observer the screen is placed; if close to the screen the prism must be stronger. The prism may be held over either the dominant or the suspending eye. The effect of the prism is to drop the position of a given frame seen on the screen to a position apparent to the observer which is below what would be seen without the prism and the vertex angle is selected to do this. The prism image seen through the prism will be both inside and outside the suspended area as successive frames have one of the small frames moved from one edge to the other of the large frame. Ordinarily, a patient is given about 10 minutes treatment every two or three days.

Figure 22 shows a cross-sectional view and elevation of the prism and its mounting taken on the line 22—22 of Figure 21.

Figure 23 shows the ray paths from the projecting screen to the eye as they pass through prism 80 held base-up in front of the eye, and may be considered a vertical section taken through the nodal point of the eye and the macula. The projecting screen is shown at 88, and it is assumed that the type of film being projected is that shown in Figures 5 and 7 in which the upper of two smaller images is progressively staggered on successive frames. It is assumed that the lower image as x of Figure 5 is projected in the space AB of Figure 23, and that the upper image y of Figure 5 is projected in the position BC of Figure 23. If no prism is held in front of the eye, the ray paths from image AB on the screen are substantially straight lines passing through the nodal point n of the eye and form the image in the area ab on the retina. The ray path from central point M of area AB strikes the retina at m. The cornea is shown at 85, and the crystalline lens at 86, containing the nodal point n. The eye-ball is represented by 84, and the retina by 87. The showing of Figures 23 and 24, as has been explained, should be considered schematic and illustrative, the distances and dimensions being exaggerated.

If, now, the base-up prism 80 is held in front of the eye, the effect is to drop the position apparent to the observer of the projected frames to an apparent lower level. The ray path from point A on the screen passes through the prism at k and through the nodal point and strikes the retina at a' giving a perception of an apparent lowered position of A. Similarly the point B forms an image on the retina at a, and the prism causes the screen area AB to be represented on the retina at aa' instead of at ba. In Figure 23, the ray paths without the prism are shown in dotted lines, and the ray paths with the prism are shown in full lines. Without the prism the point C on the screen is seen at c on the retina, and with the prism point C is seen at b, passing through point h of the prism. The point P on the screen mid-way between points B and C is seen through the prism at point m of the retina, the ray path passing through i of the prism. If the area of suspension of vision is assumed to extend vertically between points a and b of the retina in Figure 23, the effect of the prism is to throw one of the screen images outside of the area of suspension. It is my intention that the image so thrown outside of this area shall be the image y of Figure 5 which is progressively staggered on successive frames, so that at least part of this moving area of the moving frame will be outside of the area of suspension on the retina. This serves to attract the attention of the brain by the motion of this image, and to stimulate fusion.

Figure 24 shows the ray paths of a horizontal section through the eye-ball taken through the nodal point of the eye and the macula, that is substantially along the line Mm of Figure 23 The lateral boundaries of the projected frames on screen 88 are shown as the points EF, between which points the successive small frames y of Figure 5 move, and form images at points e, f, on the retina near the macula. The ray paths from E, F, pass through prism 80 at points g, g', and through the nodal point n. Unless the area of suspension is very long horizontally, the horizontal translation of image y on the screen will cause the image to be projected on a point on the retina as e, f, outside the area of suspension, which will stimulate fusion.

Figure 38 shows schematically as a vertical section the assembly of a motion picture projector 89 which is projecting the film 11 having major frames and subordinate frames, on to the screen 88. The projected frames are viewed by the eye 84 through prism 80. In this figure it is assumed that screen 88 is translucent so that an image can be projected through it from the back to be visible to the observer on the opposite side, and for clarity in representation in the drawings, the projector 89 is shown on the opposite side of screen 88 from the observer's eye 84. However, in ordinary practice, the screen 88 will not be transparent, and the projector 89 will be on the same side of screen 88 as the observer, and usually farther from the screen than the observer.

Figure 25 shows what a normal eye sees without a prism, with a composite film in which one small image as x occupies a fixed position in the lower transverse half of successive frames which is on the extreme left margin of the frame as shown at 91. In Figure 25, the other small frame as y is shown as oscillating across the upper transverse half of the large frame occupying the successive position shown in dotted lines.

Figure 26 shows the arrangement of the images projected on the screen and as seen without a prism with the arrangement shown in the film of Figure 5, wherein one small image 93 is centrally positioned in the lower transverse half of successive frames in the same relative position, while the other small image 92 is positioned in the upper transverse half of successive large frames in progressively staggered positions, and is seen on the screen as moving from an extreme left to an extreme right position, as shown in dotted lines in Figure 26.

Figure 27 shows the frame as projected on the screen corresponding to the showings of Figures 25 and 26, except that Figure 27 shows what is projected from a composite film wherein the fixed frame 95 occupies the extreme right position in the lower transverse half of the large frame, and the upper small frame 94 oscillates between the extreme left and extreme right positions, as shown in dotted lines.

Figure 28 shows the scene as perceived by one eye without a prism, in viewing a composite film as in Figure 5, in a composite frame having the moving frame y in vertical register with the lower fixed frame shown at 97, the upper frame being shown at 96. If a prism as 80 is now held in front of one eye, the other eye being closed, the two frames 96, 97, of Figure 28 will appear to the observer through the prism as being dropped to positions 98, 99. (Fig. 29.)

If now, the observer looks at the vertically aligned frames 96, 97, with one eye without a prism, and with the other eye through a prism, he should obtain stereopsis or an effect of perspective, as indicated in heavy lines in the middle image 101 of Figure 30, which shows the total effect perceived by the observer. It will be realized that in perceptions as represented in Figure 30 the upper and lower frames 100 and 102 may be not seen as clearly as the stereoptic image in the middle. Even a patient who has a mild suspenopsia may be able to obtain fusion when the upper frame is vertically aligned with the lower frame, as shown in Figures 28 to 30, instead of the upper frame being horizontally displaced with reference to the lower frame, as shown in other frames of Figure 5.

Figure 31 shows the scene observed by the eye as projected on the screen from a composite film of Figure 5 from a frame in which the upper frame 103 is in an extreme left position and is well out of vertical alignment with lower small frame 104. Figure 32 shows what an observer sees looking at the projected scene of Figure 31 with a prism over one eye and no prism over the other eye, the frames 105 and 107 being seen without the prism directly from frames 103 and 104 of Figure 31, and the frames 106 and 108 of Figure 32 being dropped in position by being observed through the prism. If the visual faculties of the observer are not able to fuse the two middle images 106 and 107, he will see four separate monocular images as shown in Figure 32; such failure to obtain fusion may be due to the frames 103 and 104 not being sufficiently close together. Figure 33 shows what is seen by an observer with a prism over one eye and no prism over the other eye in looking at a projected composite frame in which the upper frame overlaps the lower frame a short distance, assuming that the observer is able to fuse the two middle images to obtain stereopsis in middle frame 109. The effect of the prism in the overlapping frames of Figure 33 is similar to that in Figure 32, that is, upper frame 105a is dropped level with the lower frame as projected, and the lower frame as projected is dropped to the position 108a. This indicates the advantage of moving the upper frame transversely across the screen so that it will in some positions be within the fusion power of the observer.

Figure 34 shows what an observer sees in looking with both eyes at the projected scene from an ordinary stereoscopic film having respective left and right frames horizontally aligned and not staggered, if not using any special optical device. Only monocular vision is obtained, and one frame will probably be suspended to avoid double vision.

Figure 35 shows what the observer with or without a suspending eye sees in looking at the scene projected on the screen from a composite frame of the film of Figure 5 having the upper frame well to the left of the lower frame 113, if no prism is used.

Figure 36 shows what an observer having a suspending eye sees in looking at the projected scene of Figure 35 with a prism over one eye and no prism over the other eye, assuming that the frame 115 falls on the suspending area of the suspending eye. This frame 115 is seen if suspension is relieved, and it will be fused into one picture with frame 116 if within the duction range of the patient. When suspension re-occurs, frame 115 disappears and only the three frames 114, 116, and 117 are seen. If one eye is obstructed, the suspension will cease if the unsuspended eye is so obstructed, and monocular vision will be obtained of the two staggered frames.

Figure 37 shows what may be seen by an observer who fails to attain stereopsis, in observing a projected composite frame in which the upper frame 118 overlaps lower frame 121 a short distance, if the observer is unable to achieve stereopsis, and one frame 120 is suspended or flickers in and out. In starting treatment with a suspenopsia patient there will at first probably be entire suspension of one frame as 115 in Figure 36, but as treatment progresses this frame will probably flicker in and out, until fusion is attained if the frames are close enough together. If the excursions of the transversely moving frame are too wide, the picture is seen double for most of the composite frames, and it is then necessary to reduce the length of the excursion so that fusion is attained for at least most positions of the moving frame.

In Figure 10 the entire usual pull-down mechanism is mounted on movable plate 33, but is not shown in detail for purposes of simplification. The pull-down claws are shown in Figure 14 at 49, and engage slots 36 in Figure 10. In Figure 10 only the positive film track is shown, with the oscillating mechanism. The negative track is the same as the positive, with the exception of the omission of the oscillating mechanism in the negative. For the positive aperture vertical and horizontal framing screws are provided to vary the framing over the entire area of the positive aperture.

The members 39 which engage slots 31, 32, may be balls seated in sockets in movable plate 33. For horizontal motion, plate 33 is guided by removable rollers 33a. For vertical motion plate 33 is guided by removable rollers 33b. For vertical motion lever 34 is attached to plate 33, and lever 47 is removed. For vertical motion, lever 47 is attached to plate 33 and lever 34 is removed.

The drive wheel 43 on shaft 44 for the reciprocating mechanism may be connected to the main drive of the printer, and operates in such a way that ratchet 41 is in motion only when the shutter closes aperture 46 and the pull-down claws are moving the film. The entire pull-down mechanism may be driven by an arrangement of universal joints and splined shafts, with gears and universals, in a conventional manner which is not shown and does not require detailed description. The amount of movement of ratchet 41 can be varied, and the rate of movement of plate 33 varied, by attaching pawl 42 at varying distances from the center of drive wheel 43. The pull-down for the wide film has twice the travel of that of the negative film.

While I have described a particular way of producing the type of composite film which I disclose, such as illustrated for instance in Figure 5 with certain overprinted small frames progressively staggered on successive frames, using the oscillating step printer of Figure 10 for instance, it will be realized that my composite film having certain images in progressively staggered positions may be produced by other arrangements for instance by a system of moving mirrors, and I do not intend to limit my invention to such composite films produced only by the particular oscillating step printer which I describe in detail. It will also be realized that an oscillating step printer to produce the results which I obtain needs only to have relative movement of the wide unexposed film with reference to the projected image of the small frame, and that this may be accomplished by keeping the wide film at rest and moving the rest of the apparatus and the image of the small frame with it.

In employing my invention for treating suspenopsia, the composite staggered film of Figure 5 is projected as with an ordinary 16 millimeter projector, and the projected scene is viewed by the patient holding a prism in front of one eye. If the upper small frame is horizontally translated, the prism is held base up, and if the lower small frame is horizontally translated the prism is held base down. In the case of the relatively small number of patients for whom film of the type shown in Figure 18 is required, the prism will be held with the base to the right. For treating various patients and for various stages in treatment of a given patient, staggered films will be required having different widths of excursions of the moving frame. An advantage of my composite film having one small frame positioned on the large frame in staggered relation to the other small frame is that thereby the one small frame can be moved completely across the large frame into alignment and entirely out of alignment with the other small frame, and hence back and forth in and out of the suspended area of the retina, which can not be done with unstaggered ordinary stereoptic film. The effect of the prism is to cause the moving upper frame as CB (Figure 23) to be seen by the eye in the apparent position BA, where it may be fused with the image seen in the position BA with the other eye which has no prism. The prism displaces the lower frame BA to a lower position as apparently seen by the eye at the position a' of the retina, so that the apparent position BA is where the line a'nk intersects the screen. If the moving frame CB without the prism would fall inside of the suspended area, the use of the prism will throw this moving frame outside of the suspended area, at least in part, which will stimulate the fusion sense, and attract the attention of the visual faculties.

My invention has been employed in the treatment of many cases of suspenopsia with very successful results, and with satisfactory progress. The apparatus which I employ is easily portable and simple to use and is very practical.

From the foregoing description of the construction of my improved device, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described the invention, what is claimed is:

1. A motion picture film for fusion training having a succession of major frames which individually comprise a pair of respectively left and right subordinate frames of corresponding stereoscopic views, each of said subordinate frames occupying separate fractional parts of the area of their said major frame, said left subordinate frames forming a left series and said right subordinate frames forming a right series, all of the subordinate frames of one of said series occupying the same relative position on successive major frames, and the subordinate frames of the other of said series occupying on successive major frames cyclically progressively staggered positions.

2. A motion picture film for fusion training having a succession of major frames which individually comprise a pair of respectively left and right subordinate frames of corresponding stereoscopic views, said left subordinate frames forming a left series and said right subordinate frames forming a right series, all of the subordinate frames of one of said series occupying a fractional part of the lower transverse half of each of said major frames, and the subordinate frames of the other of said series occupying a fractional part of the upper transverse half of each of said major frames, the subordinate frames of one of said series occupying the same relative position on successive major frames, and the subordinate frames of the other of said series occupying on successive major frames positions which are cyclically progressively staggered transversely of said film.

3. A motion picture film for fusion training having a succession of major frames which individually comprise a pair of respectively left and right subordinate frames of corresponding stereoscopic views, said left subordinate frames forming a left series and said right subordinate frames forming a right series, all of the subordinate frames of one of said series occupying a fractional part of the longitudinal half lengthwise of the film of each of said major frames adjacent one edge of said film, and the subordinate frames of the other of said series occupying a fractional part of the longitudinal half lengthwise of the film of each of said major frames adjacent the other edge of said film, the subordinate frames of one of said series occupying the same relative position on successive major frames, and the subordinate frames of the other of said series occupying on successive major frames positions which are cyclically progressively staggered longitudinally of said film.

4. In an optical apparatus for fusion training, means for projecting on a screen a series of successive motion picture major frames each comprising separate left and right subordinate frames of corresponding stereoscopic views to be fused wherein a first series of the pair of series of subordinate frames occupies on successive major frames the same relative position and the second series of the pair of series of subordinate frames occupies on successive major frames positions which are cyclically laterally spacially displaced transversely of said major frames, and a triangular prism adapted to be positioned before one eye when viewing the screen and having its apex positioned pointing away from the side of said major frames on the screen closest to which successive ones of said second series of subordinate frames are positioned, said prism having a vertex angle sufficient to displace one of the subordinate frames into alignment with the other subordinate frame transversely of the major frame as viewed through said prism.

5. In an optical apparatus for fusion training, a projector adapted for projecting motion pictures from film on to a screen, and a motion picture film having a series of major frames and mounted in actuating relation to said projector, each of said major frames comprising a pair of separate respectively left and right subordinate frames of corresponding stereoscopic views to be fused, the subordinate frames of a first series of the pair of series of subordinate frames occupying on successive major frames the same relative position and the second series of the pair of series of subordinate frames occupying on successive major frames positions which are cyclically spacially displaced transversely of said major frames, and a triangular prism adapted to be positioned before one eye when viewing the screen and having its apex positioned pointing away from the side of said major frames on the screen closest to which successive ones of said second series of subordinate frames are positioned, said prism having a vertex angle sufficient to displace one of the subordinate frames into alignment with the other subordinate frame transversely of the major frame as viewed through said prism.

6. A motion picture film for fusion training having a succession of major frames which individually comprise a pair of respectively left and right subordinate frames of corresponding stereoscopic views, said left subordinate frames forming a left series and said right subordinate frames forming a right series, all of the subordinate frames of one of said series occupying on successive major frames a fractional part of the same one diametral half of each of said major frames, and the subordinate frames of the other of said series occupying on successive major frames a fractional part of the other diametral half of each of said major frames, the positions of said subordinate frames relative to each other being on successive major frames cyclically progressively staggered along the diametral boundary between said diametral halves.

7. A motion picture film for fusion training having a succession of major frames which individually comprise a pair of subordinate frames of substantially identical corresponding views of substantially the full field of view of the same subject, a first one of each of said pairs forming a first series and the second one of each of said pairs forming a second series, all of the subordinate frames of one of said series occupying on successive major frames a fractional part of the same one diametral half of each of said major frames, and the subordinate frames of the other of said series occupying on successive major frames a fractional part of the other diametral half of each of said major frames, the positions of said subordinate frames relative to each other being on successive major frames cyclically progressively staggered along the diametral boundary between said diametral halves.

8. A motion picture film for fusion training having a succession of major frames which individually comprise a pair of subordinate frames of substantially identical corresponding views of substantially the full field of view of the same subject, a first one of each of said pairs forming a first series and the second one of each of said pairs forming a second series, each of said subordinate frames occupying a separate fractional part of the area of its said major frame, all of the subordinate frames of one of said series occupying the same relative position on successive major frames, and the subordinate frames of the other of said series occupying on successive major frames cyclically progressively staggered positions.

9. A motion picture film for fusion training having a succession of major frames which individually comprise a pair of subordinate frames of substantially identical corresponding views of substantially the full field of view of the same subject, a first one of each of said pairs forming a first series and the second one of each of said pairs forming a second series, all of the subordinate frames of one of said series occupying a fractional part of the lower transverse half of each of said major frames, and the subordinate frames of the other of said series occupying a fractional part of the upper transverse half of each of said major frames, the subordinate frames of one of said series occupying the same relative position on successive major frames, and the subordinate frames of the other of said series occupying on successive major frames positions which are cyclically progressively staggered transversely of said film.

10. A motion picture film for fusion training having a succession of major frames which individually comprise a pair of subordinate frames of substantially identical corresponding views of substantially the full field of view of the same subject, a first one of each of said pairs forming a first series and the second one of each of said pairs forming a second series, all of the subordinate frames of one of said series occupying a fractional part of the longitudinal half lengthwise of the film of each of said major frames adjacent one edge of said film, and the subordinate frames of the other of said series occupying a fractional part of the longitudinal half lengthwise of the film of each of said major frames adjacent the other edge of said film, the subordinate frames of one of said series occupying the same relative position on successive major frames, and the subordinate frames of the other of said series occupying on successive major frames positions which are cyclically progressively staggered longitudinally of said film.

11. In an optical apparatus for fusion training, a projector adapted for projecting motion pictures from film on to a screen, a motion picture film having a succession of major frames which individually comprise a pair of subordinate frames of substantially identical corresponding views of substantially the full field of view of the same subject, a first one of each of said pairs forming a first series and the second one of each of said pairs forming a second series, all of the subordinate frames of one of said series occupying on successive major frames a fractional part of the same one diametral half of each of said major frames, and the subordinate frames of the other of said series occupying on successive major frames a fractional part of the other diametral half of each of said major frames, the positions of said subordinate frames relative to each other being on successive major frames cyclically progressively staggered along the diametral boundary between said diametral halves, and a triangular prism adapted to be positioned before one eye when viewing the screen and having its apex-base line substantially perpendicular to the direction of successive displacement of said subordinate frames, said prism having a vertex angle sufficient to displace one of the subordinate frames into alignment with the other of the subordinate frames diametrally of said major frames as viewed through said prism.

12. A motion picture film for fusion training having a succession of major frames which individually comprise a pair of subordinate frames of substantially identical corresponding views of substantially the full field of view of the same subject, a first one of each of said pairs forming a first series and the second one of each of said pairs forming a second series, all of the subordinate frames of one of said series occupying a fractional part of the lower transverse half of each of said major frames, and the subordinate frames of the other of said series occupying a fractional part of the upper transverse half of each of said major frames, the positions of said subordinate frames relative to each other being on successive major frames cyclically progressively staggered transversely of the film.

13. A motion picture film for fusion training having a succession of major frames which individually comprise a pair of subordinate frames of substantially identical corresponding views of substantially the full field of view of the same subject, a first one of each of said pairs forming a first series and the second one of each of said pairs forming a second series, all of the subordinate frames of one of said series occupying a fractional part of the longitudinal half lengthwise of the film of each of said major frames adjacent one edge of said film, and the subordinate frames of the other of said series occupying a fractional part of the longitudinal half lengthwise of the film of each of said major frames adjacent the other edge of said film, the positions of said subordinate frames relative to each other being on successive major frames cyclically progressively staggered lengthwise of the film.

14. The subject matter of claim 6, said subordinate frames further being so positioned on said major frames that for certain major frames the projections of said subordinate frames on said diametral boundary overlap.

15. The subject matter of claim 7, said subordinate frames further being so positioned on said major frames that for certain major frames the projections of said subordinate frames on said diametral boundary overlap.

KENNETH H. OAKLEY.